Dec. 8, 1925.  
F. KRUSE  
1,564,588  
SAUSAGE FORMING MACHINE  
Filed Jan. 26, 1925  
5 Sheets-Sheet 1
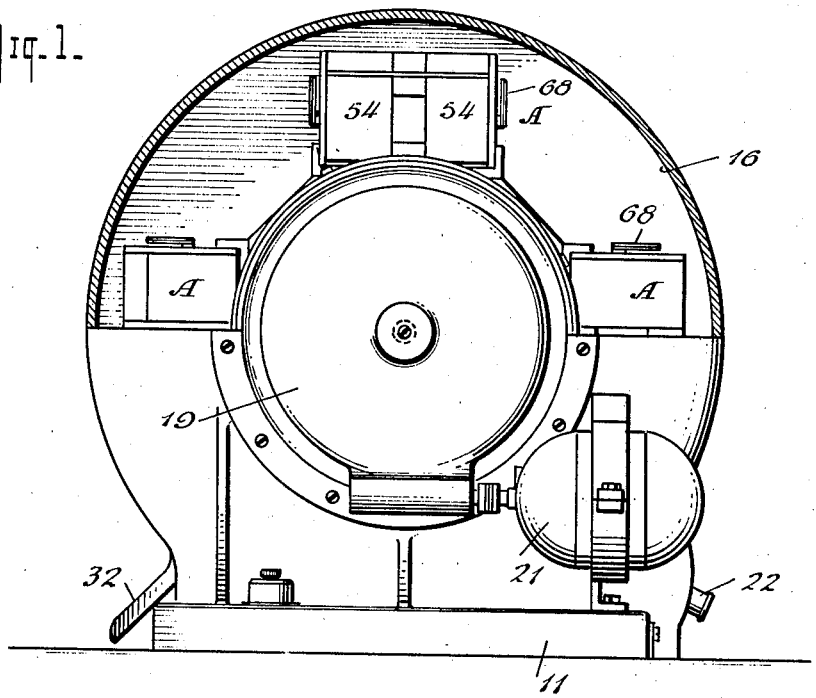
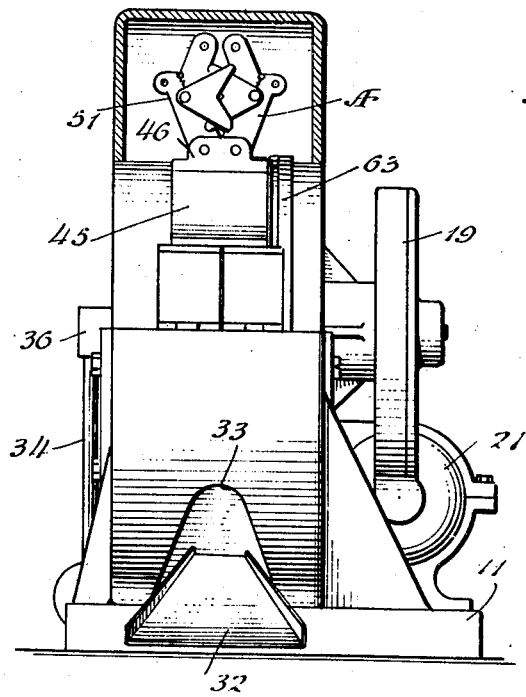
INVENTOR  
FERDINAND KRUSE  
BY  
ATTORNEYS Dec. 8, 1925.                                                    1,564,588
F. KRUSE
SAUSAGE FORMING MACHINE
Filed Jan. 26, 1925           5 Sheets-Sheet 2
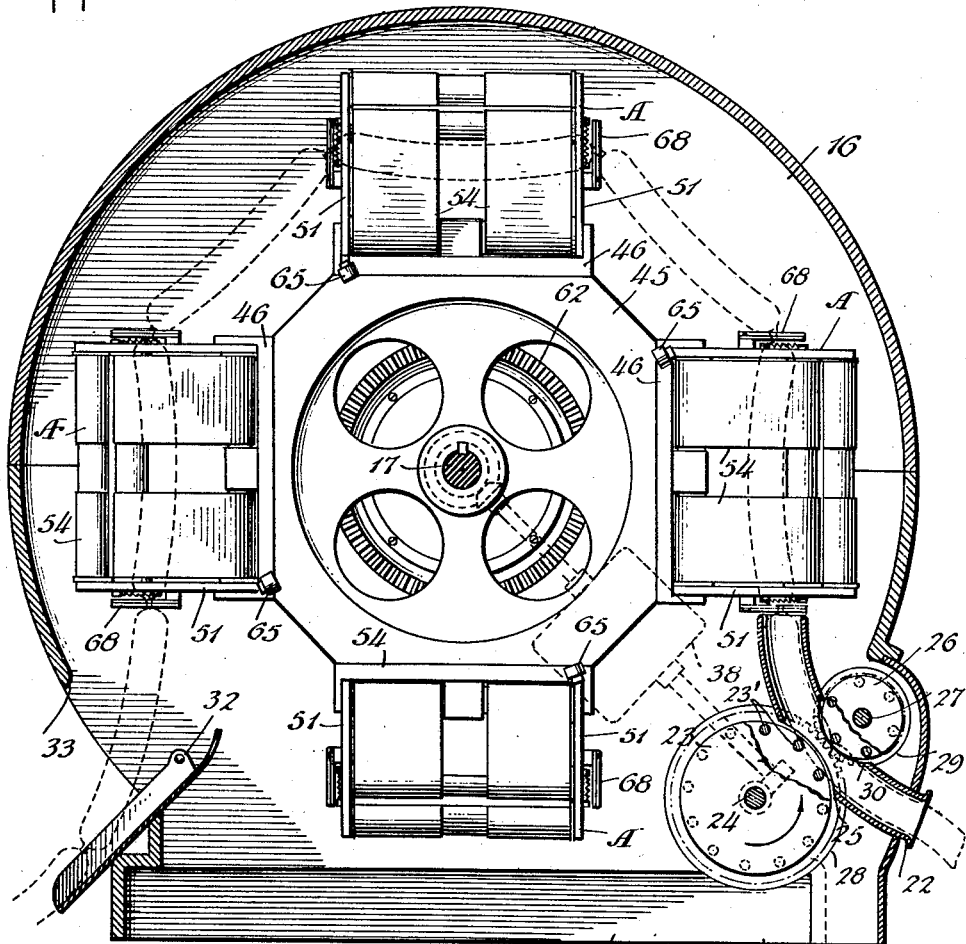
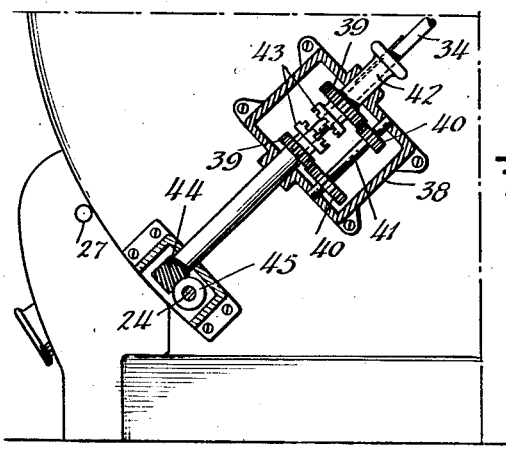
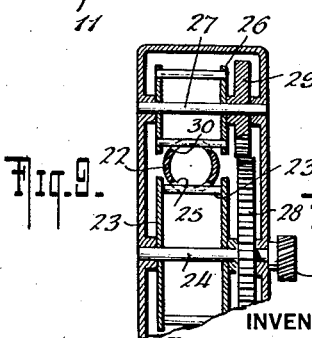
INVENTOR
FERDINAND KRUSE
BY
ATTORNEYS Dec. 8, 1925.  1,564,588
F. KRUSE
SAUSAGE FORMING MACHINE
Filed Jan. 26, 1925   5 Sheets-Sheet 3

INVENTOR
FERDINAND KRUSE
BY
Richards & Geer
ATTORNEYS

Dec. 8, 1925.
F. KRUSE
1,564,588
SAUSAGE FORMING MACHINE
Filed Jan. 26, 1925  5 Sheets-Sheet 4
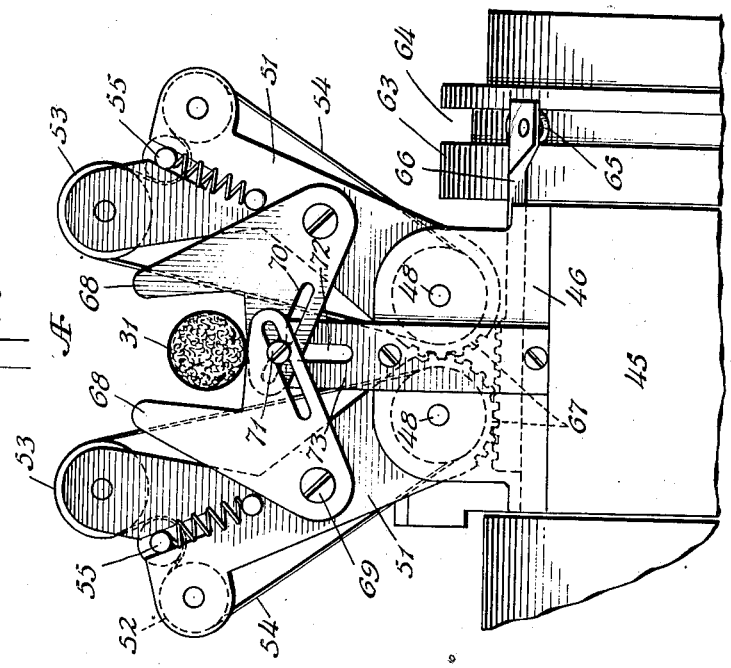
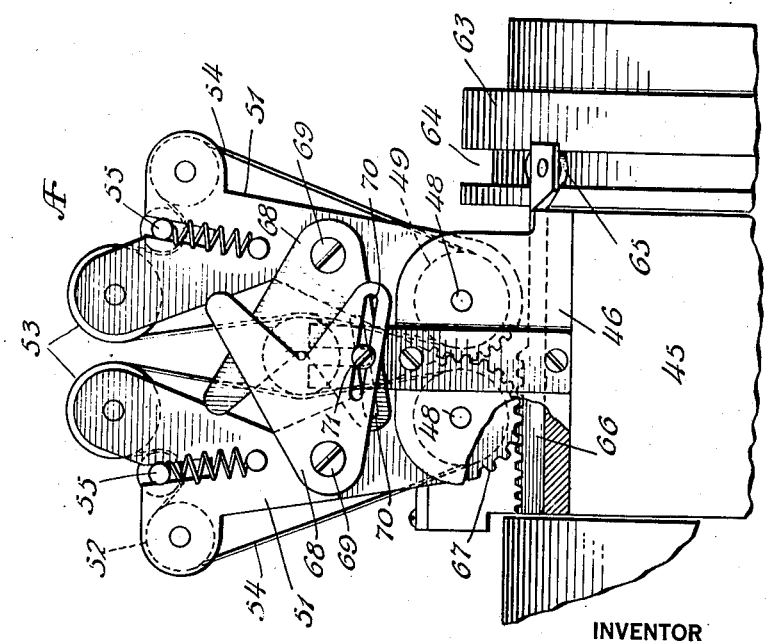
INVENTOR
FERDINAND KRUSE
BY
ATTORNEYS

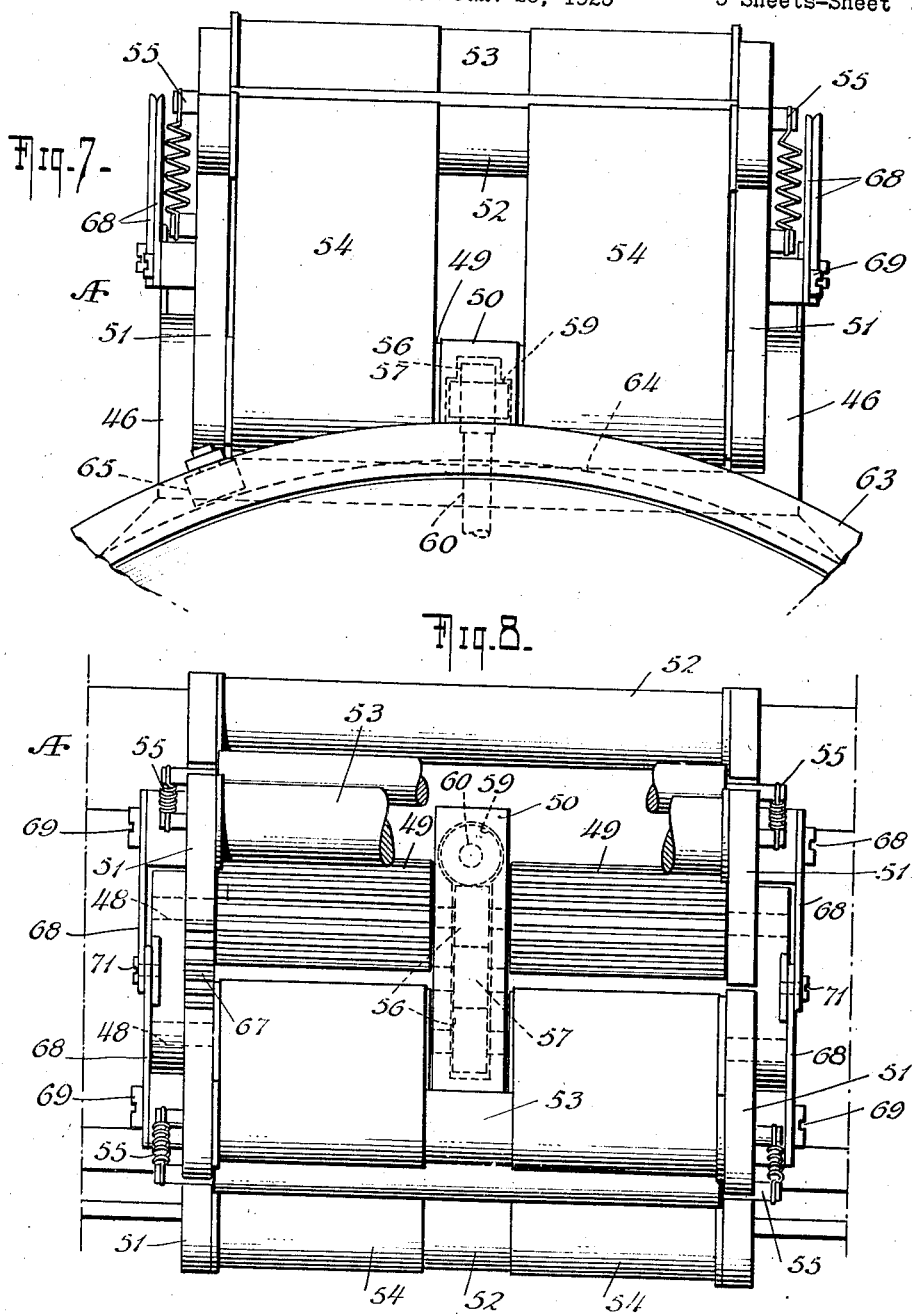

Patented Dec. 8, 1925.

1,564,588

UNITED STATES PATENT OFFICE.

FERDINAND KRUSE, OF NEW YORK, N. Y., ASSIGNOR OF ONE-HALF TO HENRY COHN, OF NEW YORK, N. Y.

SAUSAGE-FORMING MACHINE.

Application filed January 26, 1925. Serial No. 4,644.

*To all whom it may concern:*

Be it known that I, FERDINAND KRUSE, a citizen of the United States, residing at New York city, borough of Bronx, county of Bronx and State of New York, have invented certain new and useful Improvements in Sausage-Forming Machines, of which the following is a specification.

This invention relates to improvements in sausage forming machines, and has particular reference to a machine of a type similar to that shown in my co-pending application, Serial No. 726,652, filed July 18, 1924.

An object of the present invention is to provide a machine of comparatively simple and practical construction, the parts of which are so assembled and arranged as to form a compact structure having a maximum degree of efficiency in operation.

Another object is to provide an improved mechanism operable to feed the sausage casing to the crimping and twisting mechanism in such manner that injury to the casing, which might occur during the crimping and twisting operations, will be avoided.

A further object is to positively control, in an improved manner, the operation of the elements of the crimping and twisting mechanism so that the operation of twisting the casing will start contemporaneously with the crimping operation.

The above and other objects will appear more clearly from the following detailed description, when taken in connection with the accompanying drawings, which illustrate a preferred embodiment of the inventive idea.

In the drawings—

Figure 1 is a front elevation, partly in section, of the machine constructed in accordance with the invention;

Figure 2 is a side elevation, partly in section, looking at the delivery end of the machine;

Figure 3 is an enlarged vertical longitudinal section through the machine;

Figure 5 is a detail side elevation of one of the crimping and twisting mechanisms shown in its operative position;

Figure 6 is a similar view showing the mechanism in its inoperative position;

Figure 7 is a side elevation of the crimping and twisting mechanism;

Figure 8 is a top plan view thereof, partly broken away;

Figure 9 is a longitudinal sectional view through a variable speed transmission utilized to control the operation of the feeding mechanism and located upon the back of the machine; and Figure 10 is a section through the feeding mechanism.

Figure 4:
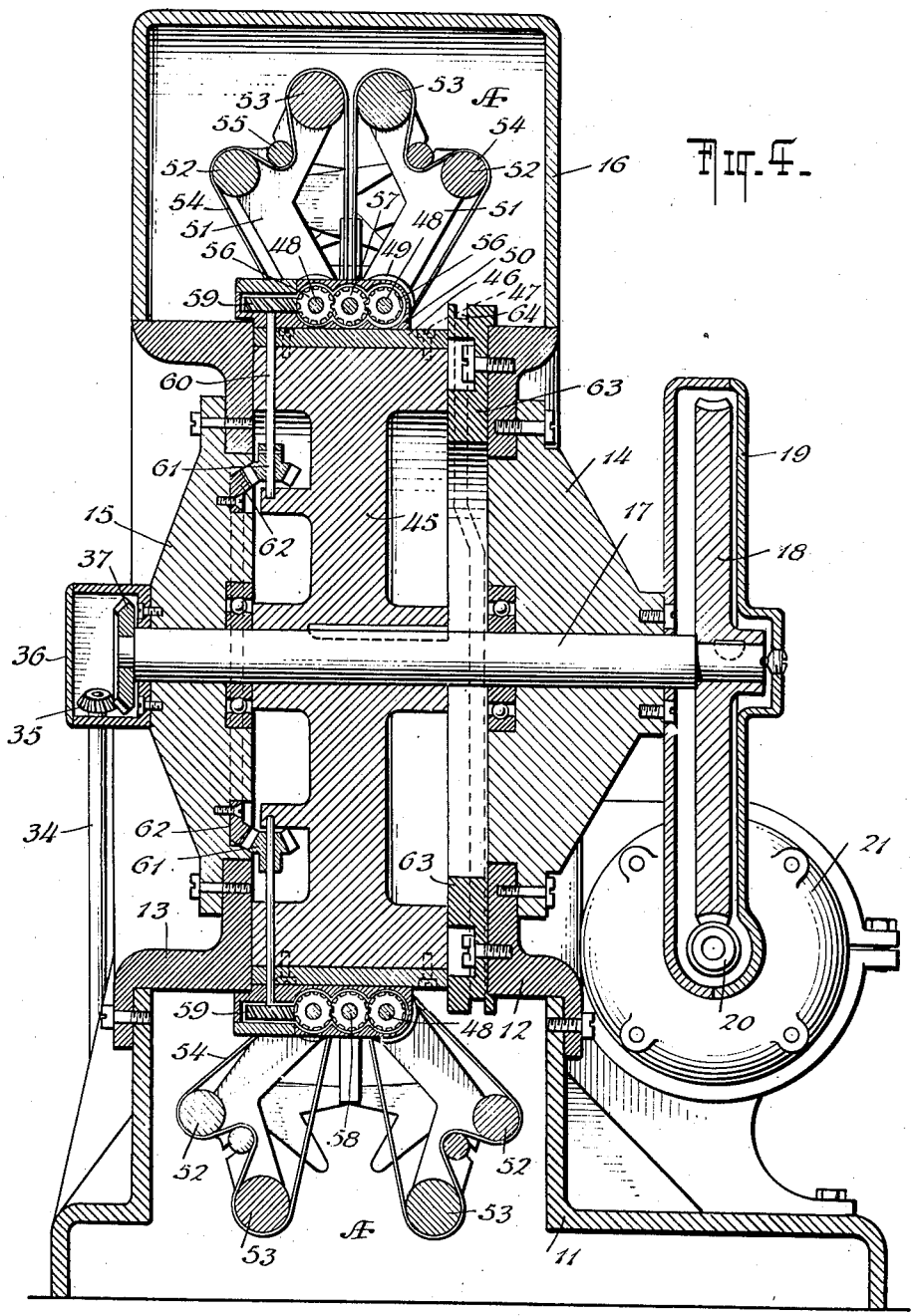
Figure 4 is a transverse section therethrough.

The present invention has been so designed as to enable practically the entire apparatus to be enclosed within a housing of substantially circular formation in front elevation. In accordance with the invention the housing is shown as consisting of a base portion 11 to which is secured by any suitable means the front and back ring members 12 and 13. These latter members have, in turn, secured thereto the front and back central hub portions 14 and 15 and support the top or cover section 16 which may be readily removed when access to the interior of the housing is desired.

Extending centrally through the hub portions 14 and 15 is a rotatable shaft 17 upon one end of which is mounted a worm wheel 18 enclosed within a casing 19 secured to the hub 14 and driven through a worm gear 20 also enclosed within said casing and mounted upon the shaft of a small electric motor 21, or any other suitable source of power, said motor being preferably mounted upon the base portion 11, as clearly shown in Figures 1 and 4.

An inlet for the filled sausage casings is provided, preferably in the form of an arcuate tubular guide member 22 mounted in the base portion of the housing and extending upwardly thereinto with the lower end of the guide member projecting from the housing so that the sausage casing may be readily inserted into the member at the beginning of the operation of the machine. The mechanism enclosed within the housing is employed for the purpose of feeding the casing through the member 22 to the crimping and twisting mechanisms generally indicated by the character A and presently to be described in detail. This feeding mechanism preferably consists of a large wheel 23 mounted upon a suitable shaft 24 and arranged to have its spaced transverse rods 23' project slightly into the guide member 22 through an opening 25 therein so that said rods will frictionally engage the casing and aid in moving the same upwardly through said guide member. Associated with the large wheel 23 is a smaller wheel 26 of similar construction carried by a shaft 27 driven in an opposite direction from the shaft 24 by means of gears 28 and 29, the former of which is carried by said shaft 24. The rods of the wheel 26 are so disposed with respect to those of the wheel 23 that each rod of the former wheel, when located in the opening 30 of the guide member, will frictionally engage with the casing 31 at a point intermediate the points of engagement of the rods 23' with said casing and thereby aid in feeding the latter through the guide member.

In practice, the pressure of the rods of the wheels 23 and 26 upon the sausage casing is very slight and is not intended to accomplish a crimping action upon the casing, but merely to engage the same with sufficient friction to feed it to the mechanisms A. After the sausage casing has been crimped and twisted by the mechanisms A which revolve about the shaft 17 as a center the links formed by said mechanisms are discharged therefrom onto a chute 32 arranged in an inclined position with the outlet opening 33 of the housing disposed opposite to the guide member 22, as clearly indicated in Figure 3. The large wheel 23 of the feeding mechanism is positively driven through the intermediary of a transmission mechanism of a suitable construction controlled by the rotation of the shaft 17 in such manner that the sausage casing is fed through the member 22 at a greater speed than that of rotation of the mechanisms A. This feeding speed is sufficient to produce the slack in the casing prior to the crimping and twisting mechanisms so that when the casing is acted upon by each of the mechanisms A in succession the crimping and twisting operation will have no detrimental effect upon the casing such as an undue stretching thereof would produce. The variable speed transmission in addition to effecting the result just mentioned may be utilized to control the feeding of the casing in such manner as to increase the amount of slack over and above that which is ordinarily obtained and in this manner the length of each link of sausage may be proportionately increased. Thus in the ordinary operation of the machine it is customary to produce a link six inches long, but by increasing the speed of the feeding mechanism it is possible to increase the length of the link to seven inches if desired.

The mechanism for driving the wheel 23 preferably consists of a sectional shaft 34 arranged at the back of the machine and having a bevel gear 35 at its upper end enclosed in a small housing 36 and meshing with a similar gear 37 within said housing secured to the rear end of the shaft 17. Intermediate the ends of the shaft there is provided a gear transmission 38 including the intermeshing gears 39 and 40, the latter being carried by a countershaft 41. One of the gears 39 is carried by a sliding member 42 and normally drives the lower section of the shaft 34 through the countershaft gears. The member 42 may be adjusted longitudinally of the shaft to disengage the gear 39 carried thereby from the gear with which it meshes and in so doing the two clutch elements 43 are brought into cooperative relation so that the drive may be transmitted from the upper section of the shaft to the lower section directly instead of through the countershaft. In this manner the speed of rotation of the lower section of the shaft may be varied to produce links of different lengths. The lower section of the shaft carries a spiral gear 44 which meshes with a similar gear 45 which in turn drives the shaft 24 in a counterclockwise direction, as indicated by the arrow in Figure 3.

The crimping and twisting mechanisms A and supporting means therefor will now be described in detail. To support these mechanisms there is provided a rotor 45 keyed upon the shaft 17 and interposed between the members 12, 14 and 13, 15 constituting portions of the front and back of the machine. This rotor is provided with a plurality of flat faces upon its periphery corresponding in number to the number of mechanisms A and which form supporting surfaces for said mechanisms. Inasmuch as the mechanisms A are all of like construction it is believed that a description of one will suffice.

Each mechanism A consists of a base 46, which is detachably secured to the rotor by means of screws or other fasteners 47 so that should it be desired to remove one of the mechanisms A for purposes of repair or replacement this can readily be done simply by removing the top 16 of the housing so that access may be had to the interior in order to remove the screws 47. Mounted for rotation in the base 46 and extending longitudinally thereof are a pair of shafts 48 each of which carries a pair of corrugated rollers 49 (see Figure 8) arranged on opposite sides of the enlargement 50 disposed intermediate the ends of the base 46. Each end of each of the shafts 48 has loosely mounted thereon for rocking or pivotal movement an angular arm 51, the arms on adjacent ends of the shafts being oppositely disposed and movable toward and away from each other for a purpose and a manner which will presently appear. The supporting arms at the ends of each shaft 48 are connected by intermediate rollers 52 and the free extremities of said arms are connected by similar rollers 53. Extending about the rollers 49, 52 and 53, which connect the arms 51 mounted upon each shaft 48, is an endless twisting element preferably made of an elastic material such as rubberized fabric suitable for engaging and rotating or twisting the casing 31. A suitable spring tensioning device 55 carried by each of the arms 51 is engaged with the element 54 so as to impart proper tension thereto.

It is proposed to continuously drive the twisting elements 54 in the same direction so that when the sausage casing is engaged between said elements the adjacent portions of the latter will cooperate to rotate or twist the casing. To this end the enlargement 50 of the base 46 has mounted therein a train of gearing consisting of the gears 56 fixed to the shafts 48 and the idler gear 57 mounted upon an intermediate shaft 58. One of the gears 48 is driven by a spiral gear 59 disposed within a recess in the enlargement 50 and mounted upon the outer end of a radially extending shaft 60. In order that the gear 59 may be readily detached from the end of the shaft 60 when the entire mechanism A is removed, as previously referred to, said end of the shaft may be squared or any other suitable means may be employed to affix the gear 59 to said shaft so that said gear will be readily detachable. The inner end of the shaft 60 carries a bevel gear 61 which meshes with a stationary annular bevel gear 62 secured to the inner face of the central hub portion 15. Thus as the rotor 45 revolves it will be apparent that the shaft 62 is rotated and consequently the train of gearing consisting of the gears 56 and 57 will be operated to continuously rotate the corrugated rollers 49 and consequently impart a continuous movement to the twisting elements 54.

It is further proposed to provide means for intermittently moving the opposed supporting members or arms 51 toward and away from each other at predetermined intervals to effect the twisting operation by the elements 54. For this purpose there is provided a stationary cam 63 interposed between the front annular member 12 and the rotor 45 and secured to the former by screws or other suitable fasteners. This cam 63 is formed in its periphery with a cam groove 64 in which is engaged a roller 65 carried by one end of a rack bar 66 extending transversely of the base 46. The inner ends of the supporting arms 51 are provided with intermeshing teeth 67 and the teeth of one of the arms is engaged by the teeth of the rack bar 66 so that when said rack bar is reciprocated under the influence of the cam groove 64, as the rotor rotates, a rocking movement will be imparted to one of the arms 51 and by reason of the intermeshing relation of the teeth 67 it will be obvious that a similar movement will be imparted to the other arm in the direction of the first named arm. The cam groove 64 is so formed that as each mechanism A reaches the position shown at the right of Figure 3, the rack bar 66 is moved in a direction which will cause a rocking movement of the supporting members or arms 51 toward each other to bring the adjacent portions of the twisting elements 54 into cooperative relationship and engagement with the casing 31 to start the twisting operation. In this connection it is to be noted that the upper or inner end of the guide member 22 through which the casing 31 is fed is so positioned relative to the path of rotation of the mechanisms A that said end will pass between and intermediate the ends of the supporting members 51 and will engage portions of the crimping elements 68 carried by said members and presently to be described in detail. Thus in this manner the casing is accurately positioned with respect to the mechanism with the proper amount of slack therein, as indicated in Figure 3, so that as said mechanism is operated upon reaching the position just beyond the upper end of the member 22 the casing will be crimped between the elements 68 and simultaneusly with the engagement of said elements with said casing the elements 54 will also engage the latter to start the twisting operation. This combined crimping and twisting operation continues until the mechanism reaches the position shown at the left of Figure 3, at which time the cam groove 64 will again control the rack bar 66 to move the same in the opposite direction from that first described whereby the members 51 and the crimping and twisting elements carried thereby will be moved away from each other to free the casing 31 and thus permit it to engage the delivery chute 32 and pass out through the outlet 33 in the housing.

The crimping elements 68 and the mounting therefor will now be described in detail. These elements are made of some suitable material, preferably celluloid, and a pair of them is carried by the arms 51 at each end of the base 46. Each element 68 is cut into substantially triangular form and at one end is bifurcated to provide diagonally disposed fingers, certain of which are at all times in overlapping relation while the others are spaced when the crimping elements are inoperative so as to receive the casing 31 therebetween. However, the elements are so mounted that when the arms or members 51 are moved toward each other the last mentioned ends of said elements will come together in overlapping relation to each other so as to securely retain the casing 31 therebetween and prevent any undue movement of said casing while the crimping operation is in progress. In order to accomplish this cooperation between the elements 68 each element is pivoted as at 69 to its associated arm 51 and one of the fingers of said element is formed with a longitudinal slot 70 therein which intersects the similar slot formed in the oppositely disposed element. Extending through the intersecting slots is a pin 71 which engages in a guide slot 72 formed in the upper end of a bracket 73 carried by the base 46. The pin 71 moves longitudinally of the slot 72 as the elements 68 are operated and at the same time retains the fingers which said pin engages in constant and overlapping engagement with each other so as to prevent any possibility of said fingers separating during the crimping operation with the consequent possibility of the casing 31 being pinched between said fingers and thereby being injured.

The operation of the machine is as follows: The filled casing is inserted into the guide until the same is engaged by the wheels 23 and 26 which operate, as they are rotated, to grip the casing and feed the same upwardly through said guide. At the same time the rotor within the housing is rotating bodily the various crimping and twisting mechanisms and as one of the mechanisms reaches the position shown at the right in Figure 3, the cam 63 causes a movement of the rack bar 66 of the mechanism to move the arms 51 toward each other, thus bringing the rotating flexible elements into contact with the casing 31 which is disposed between said arms and the crimping elements 68. The movement of the arms 51 imparts a movement of the elements 68 from the position shown in Figure 6 toward that shown in Figure 5, by reason of the connection of said elements with the bracket 73. It will be understood, of course, that the arms 51 at each end of the shafts 48, together with the associated crimping elements, are moved simultaneously so that when the parts of the twisting and crimping mechanism have reached the position shown in Figure 5 a predetermined length of the casing will be defined and this length will be twisted by the rotation of the flexible elements 54. This operation continues, with the parts in the position shown in Figure 5, until the mechanism shown at the right of Figure 3 has reached the position shown at the left of said figure. At this point of the operation the cam 63 will cause a movement of the rack bar 66 in an opposite direction to swing the arms 51 away from each other to disengage the twisting and crimping elements from the casing. Continued movement of the mechanism causes the twisted length of the casing to engage the chute 32 and thus pass outwardly from the housing. The succeeding mechanisms A operate in precisely the same manner as that just previously described so that the casing 31 will be continuously twisted into predetermined lengths during the operation of the machine.

What is claimed is:

1. In a sausage forming machine, a rotor, a crimping and twisting mechanism carried by said rotor and including a base, oppositely disposed and rockingly supported members carried by said base and movable toward and away from each other, twisting elements carried by said members, means for continuously operating said twisting elements, and coacting crimping elements also carried by said members and operable when the members are moved toward each other to crimp the sausage casing therebetween.

2. In a sausage forming machine, a rotor, a crimping and twisting mechanism carried by said rotor and including a base, oppositely disposed and rockingly supported members carried by said base and movable toward and away from each other, coacting crimping elements carried by and movable with said members, twisting elements also carried by said members, a train of gearing for operating said twisting elements, and means for continuously operating said gearing including a shaft having a bearing in said rotor and extending through said base.

3. In a sausage forming machine, a rotor, a crimping and twisting mechanism carried by said rotor and including a base, means for securing said base to said rotor to permit of the crimping and twisting mechanism being detached as a unit from said rotor, supporting members carried by said base and movable toward and away from each other, twisting elements carried by said members, means for continuously operating said twisting elements, and coacting elements also carried by said members and operable when the members are moved toward each other to crimp the sausage casing therebetween.

4. In a sausage forming machine, a rotor, a crimping and twisting mechanism carried by said rotor and including a base having a recess therein, means for detachably securing said base to said rotor to permit of the crimping mechanism being removed as a unit from said rotor, supporting members carried by said base and movable toward and away from each other, twisting elements carried by said members, a train of gearing for continuously operating said twisting elements, a shaft extending through said base and into the recess therein, a gear carried by said shaft and positioned within said recess for engagement with one of the gears of the train and detachable from said shaft when said base is detached from the rotor, and crimping elements also carried by said supporting members.

5. In a sausage forming machine, a crimping and twisting mechanism including relatively movable supporting members, flexible twisting elements carried by said members, means for continuously operating said twisting elements, coacting crimping elements also carried by said supporting members, and means for intermittently moving said supporting members relative to each other to bring said twisting and crimping elements into operative relation to a sausage casing.

6. In a sausage forming machine, a crimping and twisting mechanism including relatively movable supporting members, flexible twisting elements carried by said members, means for continuously operating said twisting elements, tensioning devices for said twisting elements carried by said members, coacting crimping members also carried by said supporting members, and means for intermittently moving said supporting members relative to each other to bring said twisting and crimping elements into operative relation to a sausage casing.

7. In a sausage forming machine, a crimping and twisting mechanism including relatively movable supporting members, flexible twisting elements carried by said members, means for continuously operating said twisting elements, coacting crimping elements also carried by said supporting members, and cam controlled means for moving said supporting members toward and away from each other so that during the first named movement said twisting elements will be brought into coacting relationship to crimp and twist a sausage casing.

8. In a sausage forming machine, a rotor, a crimping and twisting mechanism carried thereby and including a base, relatively movable supporting members on said base and having intermeshing gear teeth, flexible twisting elements carried by said members, means for operating said twisting elements, crimping elements also carried by said supporting members and coacting to crimp a sausage casing therebetween when said supporting members are moved toward each other, a stationary cam adjacent said rotor, and a rack movable transversely of said rotor by said cam and engageable with the gear teeth of one of said supporting members to move said members toward and away from each other.

9. In a sausage forming machine, a rotor, a crimping and twisting mechanism thereon including a base, relatively movable supporting members carried by said base, twisting elements movable relative to said supporting members, a bracket carried by said base, crimping elements carried by said supporting members and having a sliding connection with said bracket when said supporting members are moved toward and away from each other, and means for moving said supporting members.

10. In a sausage forming machine, a rotor, a crimping and twisting mechanism thereon including a base, relatively movable supporting members carried by said base, twisting elements movable relative to said supporting members, crimping elements carried by said supporting members and overlapping each other in contacting relationship, means for maintaining said crimping elements in contact during the crimping operation, and means for moving said supporting members toward and away from each other.

11. In a sausage forming machine, a crimping and twisting mechanism including relatively movable supporting members, twisting elements carried by said supporting members and movable relative thereto, crimping elements also carried by said supporting members and having overlapping and contacting relationship with each other, means for maintaining such relationship during the crimping operation, and means for moving said supporting members relative to each other to effect the operation of said twisting and crimping elements.

12. In a sausage forming machine a crimping and twisting mechanism including relatively movable supporting members, twisting elements carried by said members and movable relative thereto, crimping elements pivoted to said supporting members and cooperating with each other in overlapping and contacting engagement, and means for maintaining said overlapping and contacting engagement during the operation of said crimping elements.

13. In a sausage forming machine, a rotor, a crimping and twisting mechanism carried by said rotor and including a base, oppositely disposed and rockingly supported members carried by said base and movable toward and away from each other, twisting elements carried by said members, means for continuously operating said twisting elements, and coacting crimping elements also carried by said supporting members and actuated by the movement of said supporting members toward each other to crimp the sausage casing therebetween.

14. In a sausage forming machine, a rotor, a bodily rotatable crimping and twisting mechanism including pivoted supporting members movable toward and away from each other, twisting elements carried by said supporting members and cooperating when the members are moved toward each other to engage and twist a sausage casing therebetween, crimping elements pivoted to said supporting members and movable therewith into and out of crimping relation with each other, a bracket with respect to which said supporting members and crimping elements are relatively movable, and connections between said crimping elements and bracket for causing said crimping elements to have a pivotal movement relative to said supporting members when the latter are moved toward each other.

15. In a sausage forming machine, a rotor, a bodily rotatable crimping and twisting mechanism including pivoted supporting members movable toward and away from each other, twisting elements carried by said supporting members and cooperating when the members are moved toward each other to engage and twist a sausage casing therebetween, crimping elements pivoted to said supporting members and movable therewith into and out of crimping relation with each other, a bracket with respect to which said supporting members and crimping elements are relatively movable, connections between said crimping elements and bracket for causing said crimping elements to have a pivotal movement relative to said supporting members when the latter are moved toward each other, gear and rack mechanism for pivotally moving said supporting members, and a single cam for actuating said rack to produce the movements of said supporting members and crimping elements.

16. In a sausage forming machine, a crimping and twisting mechanism including pivoted supporting members movable toward and away from each other, twisting elements carried by said supporting members and cooperating when the members are moved toward each other to engage and twist a sausage casing therebetween, crimping elements pivoted to said supporting members and movable therewith into and out of crimping relation with each other, each of said crimping elements being bifurcated at its free end to form arms one of which is provided with a longitudinal slot, a bracket with respect to which said supporting members and crimping elements are relatively movable, said bracket having a longitudinal slot, and a pin extending through the slots in the arms of said crimping elements and the slot in said bracket for causing said crimping elements to have a pivotal movement relative to said supporting members when the latter are moved toward each other.

In testimony whereof I have affixed my signature.

FERDINAND KRUSE.